United States Patent [19]
Busdiecker et al.

[11] 3,872,884
[45] Mar. 25, 1975

[54] EXCESS FLOW CHECK VALVE

[75] Inventors: Wayne S. Busdiecker, Wickliffe; Zdenek J. Lansky, Solon; John G. Russell, Highland Heights, all of Ohio

[73] Assignee: Parker-Hannifer Corporation, Cleveland, Ohio

[22] Filed: Nov. 20, 1972

[21] Appl. No.: 308,292

[52] U.S. Cl. .................................. 137/498, 137/504
[51] Int. Cl. ..... F16k 17/00, F16k 1/44, F16k 17/24
[58] Field of Search ........ 137/498, 504, 509, 513.3, 137/513.5, 517, 460

[56]      References Cited
        UNITED STATES PATENTS
2,245,271   6/1941   Guill .............................. 137/498 X
2,781,775   2/1957   Merrill ............................. 137/498
3,015,341   1/1962   Hedland et al. ................. 137/504 X
3,285,282   11/1966  Martin ............................ 137/504 X
3,439,704   4/1969   Berglund .......................... 137/498
3,464,439   9/1969   Budzich ........................... 137/504
3,503,417   3/1970   Tadahide Toda et al. ....... 137/504 X
3,618,626   11/1971  Russo ............................. 137/498 X
3,756,272   9/1973   Hammond ........................ 137/498

Primary Examiner—Martin P. Schwadron
Assistant Examiner—Robert J. Miller
Attorney, Agent, or Firm—John N. Wolfram

[57]      ABSTRACT

An excess flow check valve for shutting off flow through a fluid line in the event the flow rate exceeds a predetermined amount, as in case the line breaks. The valve comprises a housing having large and small diameter bore portions and a valve element that has an imperforate portion that enters the small diameter bore with a close sliding fit to close the valve when the fluid pressure differential across the valve element exceeds a predetermined amount.

8 Claims, 2 Drawing Figures

PATENTED MAR 25 1975 3,872,884

EXCESS FLOW CHECK VALVE

BACKGROUND OF THE INVENTION

Valves to prevent excess flow, as when a sudden breakage downstream of the valve increases the pressure differential across the valve element, are well-known in the art. These valves tend to be relatively expensive because of complicated housings and/or valve elements. In addition, previous designs are generally difficult to assemble.

SUMMARY OF THE INVENTION

The present invention is an improved excess flow valve that utilizes only three or four simple parts and is easy to assemble. The housing has two different size bores that form an annular shoulder therebetween. The valve poppet has an imperforate portion at one end and a perforate portion at the other end, the perforate portion including radial and longitudinal passages. The imperforate portion has a close sliding fit with the smaller diameter bore to close the same when it is therein. The poppet is spring biased toward an open position in which the imperforate portion and the radial passages are in the small diameter bore when the fluid pressure differential across the poppet exceeds a predetermined value.

One embodiment of the invention has a wide groove in the outer surface of the poppet. The housing has a groove with a snap ring anchored therein and the snap ring extends into the groove of the poppet to limit its travel. The poppet groove bottom is preferably tapered so that the snap ring can be diametrically contracted into the deep part of the groove during assembly of the parts into the housing and is opposite the shallow part of the groove in the normal open position of the valve element to prevent accidential contraction of the snap ring in the valve open position. The other embodiment of the invention has a poppet with flexible legs which deflect inwardly to enter the small diameter bore when the poppet is inserted into the housing and which then expand into a recess in the housing.

DETAILED DESCRIPTION

Figure 1:
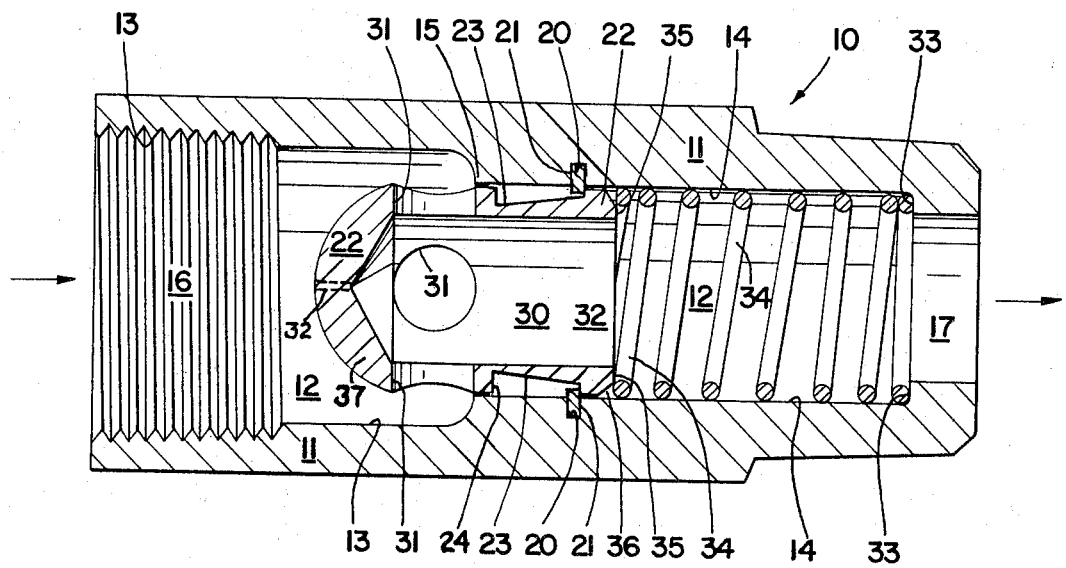
FIG. 1 is a longitudinal cross-sectional view of one embodiment of the present invention.

The excess flow check valve 10 of FIG. 1 has a body or housing 11 with a passageway 12 therethrough. Passageway 12 has a large diameter bore portion 13 and a small diameter bore portion 14 that meet to form an annular shoulder 15 intermediate an inlet 16 and outlet 17.

Small bore 14 has an annular groove 20 therein that receives a snap ring 21. Valve element or member 22 is disposed in small bore 14 with a close sliding fit and has a wide tapered groove 23 in its outer cylindrical surface into which snap ring 21 extends.

Valve element 22 has a passageway 30 therethrough that includes radial inlets 31 and an axial outlet 32. Abutting a shoulder 33 of the housing 11 is one end of a spring 34 whose other end presses against end 35 of valve element 22. Preferably, spring 34 has a flat or closed coil at each of its ends. The downstream end of valve element 22 is chamfered as at 36 to facilitate installation of snap ring 21 onto the poppet and the insertion of the poppet into small bore 14. The upstream end of 37 of valve element 21 is imperforate and of a diameter to have a close sliding fit within bore 14 so as to close the bore against fluid flow therethrough when the imperforate portion 37 is within such bore.

The bottom wall of groove 23 is tapered from a diameter at its rightward end that has a close slide fit with the inner diameter of snap ring 21 when the latter is in its normal expanded position within groove 20 to a smaller diameter at its other end that permits the snap ring to be contracted completely therein.

To assemble the valve of FIG. 1, spring 34 is first inserted into bore 14. Snap ring 21 is then mounted on the poppet and contracted into the deep end of groove 23 by a tool (not shown) whereby the poppet and the contracted ring may be inserted into small bore 14 from inlet 16 and moved therein to compress spring 34 until the poppet is in its closed position and ring 21 is opposite groove 20. At this time ring 21 expands into groove 20 and upon removal of the assembly tool spring 34 moves the poppet to its open position with the snap ring engaging the rightward transverse wall of groove 23 to retain the poppet as shown in FIG. 1 and with the inner diameter of the snap ring closely fitting the large diameter of groove 23 and the outer diameter closely fitting the outer wall of groove 20 whereby the ring cannot move appreciably in radial directions and cannot accidentally be contracted or expanded by shock, vibration, fluid flow effects, or other causes to disengage from either of grooves 20 or 23 to release the poppet from bore 14.

Figure 2:
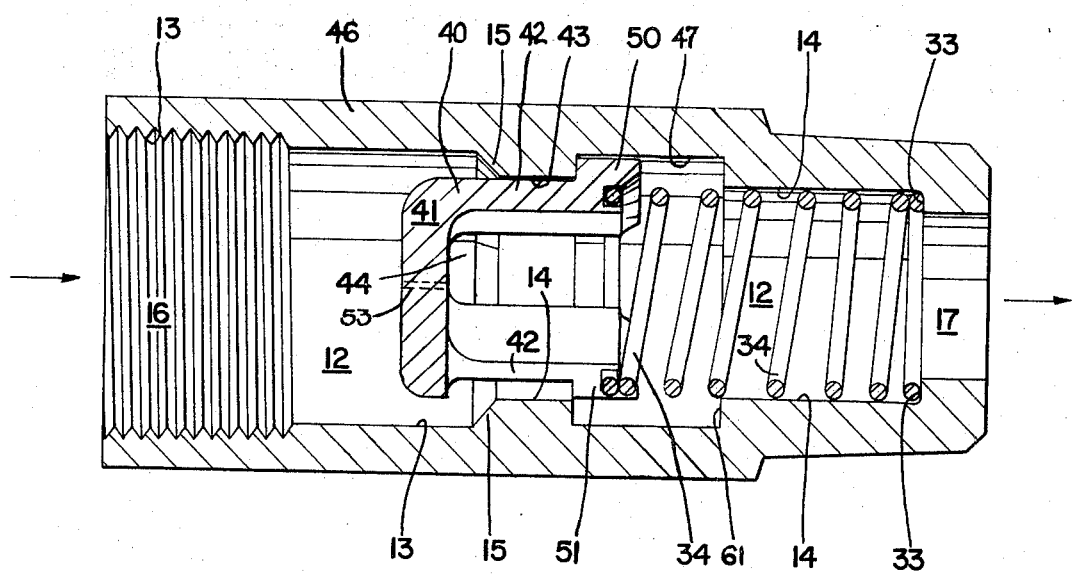
FIG. 2 is a longitudinal cross-sectional view of another embodiment.

The alternate embodiment of FIG. 2 utilizes a different valve element 40 and a somewhat different body machining. Valve element 40 has an imperforate portion 41 at its upstream end that has a close sliding fit within small bore 14 of body 46 and from which legs 42 extend to form a perforate portion of the valve element. The outer surfaces 43 of legs 42 are on a diameter having a close sliding fit with bore 14 but the downstream ends of the legs are enlarged in diameter as at 50 for reception in a recess 47 in body 46. The spaces 44 between the legs provide radial inlets for the perforate portion and the hollow interior at the legs provide axial outlets for the perforate portion. The free inner ends of legs 42 are chamfered as at 48 and have an annular recess 49 therein to receive spring 34 and prevent sideward motion or cocking thereof. Spring 34 also bears on a shoulder 33 in housing 46 and it has a closed coil 51 received in recess 49.

To assemble the valve of FIG. 2, spring 34 is likewise first inserted into housing 46. Valve element 40 is then inserted and legs 42 flex inwardly to enter small bore 14 and then expand to their normal diameter with enlargements 50 received in recess 47 and with the spring received in leg recesses 49. Not only do recesses 49 effectively capture and retain the end of the spring but the latter also prevents inward deflection of the legs by action of fluid flow.

OPERATION

Both forms of the invention operate in a like manner. When fluid flows through the valve from inlet 16 to outlet 17 the fluid pressure acting on downstream facing surfaces of poppets 22 and 41 is somewhat less than the pressure acting on upstream surfaces due to pressure drop across the poppets as the fluid flows through the poppet passages. This pressure differential and other fluid flow effects apply a net closing force upon the poppet which under normal flow conditions is counteracted by spring 34 to maintain the poppets in open position.

When flow through the valves increases beyond a predetermined rate because of a break in a downstream line and resultant decreased resistance to flow in the line, the pressure drop across the poppets also increases and the resulting greater net closing force on the poppets overcomes the opening force of the springs and causes the poppets to move to closed position. In the closed position of the poppet ports 31 and 44 are within the smaller bores 14. Excessive travel of the poppet in the closing direction is prevented in the FIG. 1 form by contact of shoulder 24 with snap ring 21 and in the FIG. 2 form by contact of leg portions 50 with shoulder 61.

When pressure differential across the poppets is reduced to a value below the predetermined value, as by shutting off incoming fluid or by repair of the downstream rupture, springs 34 will automatically move the poppets to their open positions as shown. Such return of the poppets to their open position is facilitated by having enough clearance between the outer diameter of the imperforate portions 37 and 41 such that there is a small bleed of fluid through such clearance for permitting fluid under pressure in inlet 16 to flow to outlet 17 for substantially equalizing the fluid pressure on opposite ends of the poppet after the downstream rupture has been repaired. Alternatively, a small bleed hole can be formed through such imperforate portions for this purpose, as indicated at 38 in FIG. 1 and at 53 in FIG. 2.

We claim:

1. An excess flow check valve comprising a body having a passage therethrough, said passage including a large diameter bore and a small diameter bore, a valve member slidable in said passage and having a perforate portion and a substantially imperforate portion, said perforate portion providing a passage through said member a pair of abutment faces on the body spaced from said large diameter bore and cooperable with a pair of spaced abutment faces on said valve member to limit movement of the valve member between a closed position in which said imperforate portion is in said small bore to substantially prevent flow through both the small bore and the perforate portion and an open position in which said imperforate portion and at least part of the perforate portion are within said large bore to permit flow through said valve member and said body passage, one of said pairs of abutment faces being formed by end walls of a recess in one of said body and valve members, said end walls extending in only one radial direction from said small bore, the other pair of abutment faces extending radially into said recess a resilient member mounted exteriorly of the recess so as not to engage either of said end walls and biasing the valve member toward said open position, and said valve member being movable to said closed position by a predetermined differential in fluid pressure acting on opposite ends of said valve member.

2. The valve of claim 1 in which said recess is in said valve member.

3. An excess flow check valve comprising a body having a passage therethrough, said passage including a large diameter bore and a small diameter bore, a valve element slidable in said passage and having a perforate portion and an imperforate portion, said perforate portion providing a psssage through said element, abutment means spaced from the imperforate portion and said large diameter bore to limit movement of the element between a closed position in which said imperforate portion is in said small bore to substantially prevent flow through both the small bore and the perforate portion and an open position in which said imperforate portion and at least part of the perforate portion is within said large bore to permit flow through said element and said body, a resilient member biasing the element toward said open position, said element being movable to said closed position by a predetermined differential in fluid pressure acting on opposite ends of said element, said abutment means comprising abutments on the body that are engageable with shoulders on said perforate portion, said body abutments being provided by opposite sides of a snap ring carried in a recess in said body.

4. The valve of claim 1 in which said recess is in said body member.

5. An excess flow check valve comprising a body having a passage therethrough, said passage including a large diameter bore and a small diameter bore, a valve element slidable in said passage and having a perforate portion and an imperforate portion, said perforate portion providing a passage through said element, means to limit movement of the element between a closed position in which said imperforate portion is in said small bore to substantially prevent flow through both the small bore and the perforate portion and an open position in which said imperforate portion and at least part of the perforate portion is within said large bore to permit flow through said element and said body, a resilient member biasing the element toward said open position, and said element being movable to said closed position by a predetermined differential in fluid pressure acting on opposite ends of said element, said body having an annular recess surrounding said body passage, and means cooperable with end walls of said recess for limiting movement of said element in opening and closing directions said means including a groove in the outer periphery of the element and a snap ring projecting into said groove and into said recess.

6. The valve of claim 5, in which said groove has a diameter at one of its ends that is larger than its diameter at its other end, the larger diameter closely fitting the inside diameter of the snap ring when the latter is in said recess, and the smaller groove diameter permitting contraction of the ring substantially entirely into said other end of the groove.

7. The valve of claim 5, in which said recess is narrow to prevent appreciable axial travel of said snap ring, and said groove is relatively wide to accommodate full travel of the element between its open and closed positions.

8. The valve of claim 6, in which the groove is tapered from its large diameter end to its small diameter end.

* * * * *